Nov. 21, 1967 J. W. MERCK ET AL 3,354,395
AUTOMATIC EMERGENCY SIGNALING BEACON
Filed Aug. 9, 1965
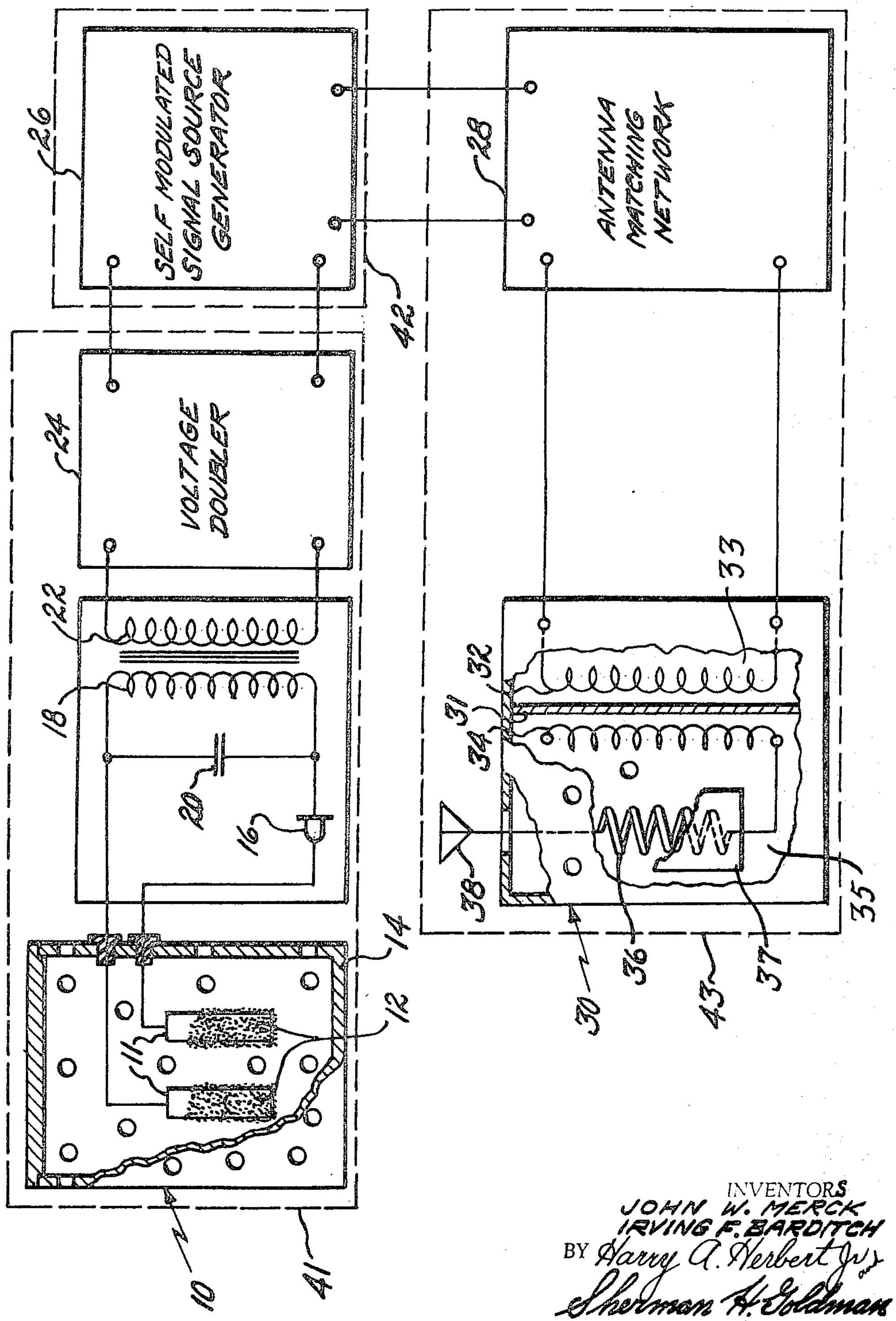

United States Patent Office 3,354,395

Patented Nov. 21, 1967

3,354,395

AUTOMATIC EMERGENCY SIGNALING BEACON

John Wayne Merck, Glen Burnie, and Irving F. Barditch, Baltimore, Md., assignors by mesne assignments, to the United States of America as represented by the Secretary of the Air Force Filed Aug. 9, 1965, Ser. No. 478,494
1 Claim. (Cl. 325—116)

ABSTRACT OF THE DISCLOSURE

An automatic emergency signaling beacon for personnel and equipment downed at sea comprising a sea water battery, DC to AC converter, a voltage doubler, a voltage controlled oscillator for modulating a distress signal over a wide band, and a spring loaded waterproof antenna which extends when exposed to water.

This invention relates to signaling beacons, and in particular to a signaling beacon which will automatically release an antenna and begin to function upon contact with water, and more preferably sea water.

In the past, when aircraft has been downed at sea, it was standard procedure for the aviators who safely reached the water to inflate their life rafts and begin sending a distress signal, usually with a hand-operated fixed frequency signal generator. If the aviator became separated from his raft or was injured or perhaps unconscious with only a life vest keeping him afloat, he would have no means of sending a distress signal, and unless visual contact could be made by a search and rescue vessel or aircraft, the aviator would be doomed to his fate.

There has long been a need, therefore, for a survival kit containing a radio which would be small enough to be attached to the clothing of the aviator and which would still provide a radio signal strong enough to be heard for many miles. Another necessary criteria is for a radio that would commence to operate on contact with the water without any action on the part of the wearer.

It is, therefore, an object of this invention to provide an automatic emergency signaling beacon for use in water.

It is a further object of this invention to provide a signaling beacon that will operate without attention from the person utilizing it.

It is a further object of this invention to provide a relatively low power radio signal generator which is both amplitude and frequency modulated.

It is still a further object of this invention to provide a radio beacon which is electrically and mechanically simple and not readily subject to failure.

It is still another object of this invention to provide a versatile radio beacon which is capable of signaling the precise location of any floating object, human or otherwise.

When dealing with transmitting apparatus utilizing self-contained power supplies, weight and bulk become a very definite problem. Where batteries are used, they may represent as much as 75% of the weight and bulk of the entire apparatus. Furthermore, batteries corrode and have a limited shelf-life requiring periodic replacement. In an attempt to overcome these disadvantages, radio signal beacons have been fitted with hand-crank generators as a source of electrical supply. This too has a serious drawback because such a generator might still comprise 50% of the weight and requires the survivor to be in good physical condition to turn the hand-crank. When he becomes too weak to operate the generator the radio is useless.

The signal beacon of this invention is broken down into three basic parts which may be contained in one small package, or packaged as three even smaller units; they are the power supply, signal generator and antenna.

The figure is a block diagram partly in schematic.

Referring now to the figure, there is shown the major components broken into three unit packages, the power supply package 41, signal generator package 42 and antenna package 43. In the first package is the power supply 10 which is a sea water battery. The battery consists of a chemical corrosion cell or cells—having magnesium, aluminum, or zinc metal and amalgamated copper as its electrodes 11, and as a result is very light and compact.

In the non-operating or non-immersed state, the electrodes would be coated with polyvinyl alcohol or another water soluble polymer 12 in order to prevent incidental oxidation or other corrosion. By mounting the power supply in a perforated impact shield 10, water will immediately enter and dissolve the protective coating and the cell will begin to generate using sea water as an electrolyte. Once operating the cell will continue to function automatically until the magnesium electrode is completely corroded away. It should be noted that the time of operation of the cell and hence the entire transmitting time can be preset by the size and shape of the cell electrodes.

Once immersed, the protective film dissolves from the cell plates, a current flows to the tunnel diode 16 and the battery will produce in the order of 1.6 volts which is suffient to operate the germanium tunnel diode. The diode begins to oscillate causing an alternating current to flow in the primary winding 18 of the transformer. The tunnel diode oscillation frequency can be modified by paralleling it with a capacitor 20 which can vary the tank circuit time constant.

The alternating current passes through the secondary of the transformer 22 where the current is decreased and the voltage raised to twelve to twenty volts in the voltage doubler 24 which is clamped to give a direct current with a superposed alternating current. This voltage may be applied to the collectors of the amplifier and oscillator stages 26, in package 42, to provide both amplitude and some incidental frequency modulation. The tunnel diode oscillator may be used to provide frequency modulation at audio rates. Likewise, some of the transformed voltage may be rectified, filtered and applied to any circuits which may require pure direct current.

From the signal source generator 26 the signal goes to package 43 containing the antenna matching network 28 and the antenna section 30 which is divided into two sections by a waterproof partition 31. Section 33 is waterproof and contains the antenna primary winding 32, while section 35 is perforated and contains the secondary antenna winding 34. The transmitting antenna 38 consists of a coiled spring of beryllium-copper wire 36, coated with a water insoluble polymer such as mylar, polyethylene, or a vinyl plastisol or organosol, to prevent short circuiting through the water. The antenna is compressed and imbedded in a water soluble material 37 such as Carbowax. Upon immersion the imbedding material would dissolve permitting the spring 36 to expand and the antenna to extend for operation.

Although the invention has been described with reference to a particular embodiment, it will be understood to those skilled in the art that the invention is capable of a variety of alternative embodiments within the spirit and scope of the appended claim.

We claim:

A self powered automatic emergency signaling beacon comprising: a sea water battery power supply, having electrodes of magnesium and amalgamated copper said electrodes being covered with a water soluble coating of polyvinyl alcohol; a controlled tunnel diode converter for changing the direct current of the battery into alternating current; a transformer connected to the converter for increasing the voltage of the battery power supply; a voltage doubler connected to the transformer for further increasing the voltage; a voltage controlled oscillator connected to said voltage doubler for generating a radio frequency signal; and a spring loaded waterproof antenna adapted to extend when immersed in water for emitting said signals when connected to the said oscillator.

References Cited

UNITED STATES PATENTS

| | | | |
|---|---|---|---|
| 1,485,776 | 3/1924 | Harrison | 325—185 X |
| 2,323,064 | 6/1943 | Lustfield | 343—709 |
| 2,593,432 | 4/1952 | Freas | 325—112 |
| 2,913,073 | 11/1959 | Wendling | 343—709 X |
| 3,132,054 | 5/1964 | Carson | 136—100 |
| 3,144,630 | 8/1964 | Clark | 325—116 X |
| 3,217,268 | 11/1965 | Kuo Chen Hu | 331—107 |

JOHN W. CALDWELL, *Primary Examiner.*

B. V. SAFOUEK, *Assistant Examiner.*